Feb. 1, 1938.    M. H. TUFT    2,106,923
WHEELED VEHICLE
Original Filed June 15, 1934
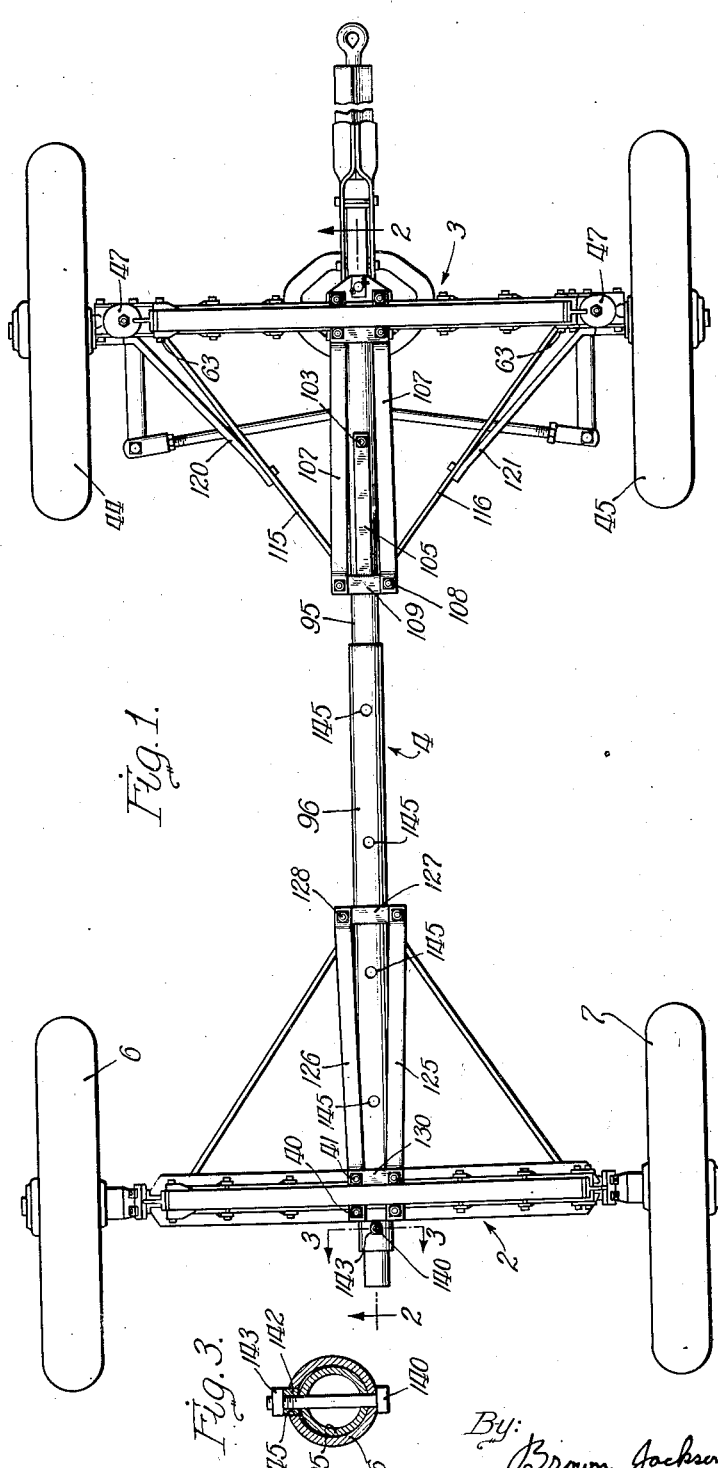
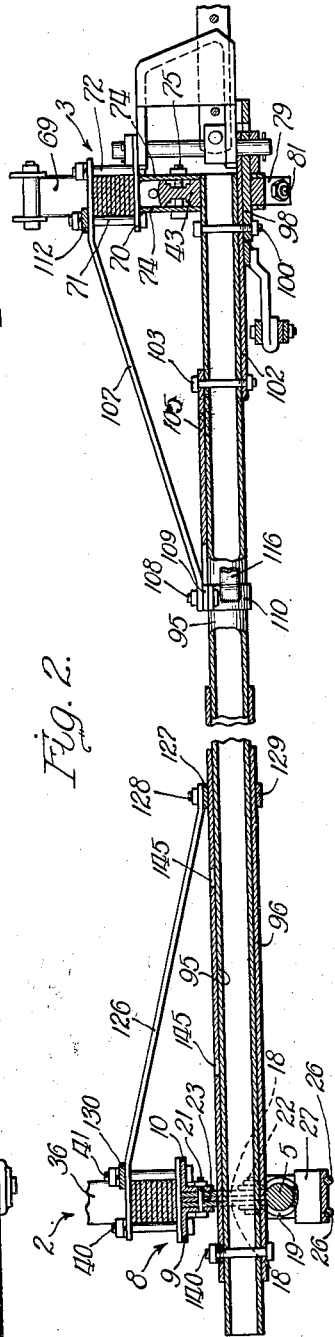
Inventor:
Miles H. Tuft
By: Brown, Jackson, Boettcher & Dienner
Attys.

Patented Feb. 1, 1938

2,106,923

UNITED STATES PATENT OFFICE 2,106,923

WHEELED VEHICLE

Miles H. Tuft, Rock Island, Ill., assignor to Deere & Company, Moline, Ill., a corporation of Illinois Original application June 15, 1934, Serial No. 730,758. Divided and this application February 8, 1935, Serial No. 5,523

2 Claims. (Cl. 280—142)

This application is a division of my copending application, Serial No. 730,758, filed June 15, 1934, now Patent 2,059,419 issued Nov. 3, 1936.

The present invention relates generally to wheeled vehicles and the like, and particularly to running gears for wheeled vehicles such as trailers, wagons and similar vehicles.

The principal object of the present invention is the provision of a new and improved reach pole construction by which the front and rear gears are connected together for relative angular displacement about a generally longitudinal axis, whereby the vehicle can easily accommodate itself to ground and road irregularities without the use of loosely connected parts which are likely to wear, rattle, or lose their position or adjustment.

In running gears for trailers, wagons and the like, employing four wheels as distinguished from trailers and vehicles of the cart type employing two wheels, it is necessary that the front running gear be able to rotate about a generally longitudinal axis with respect to the rear gear. Heretofore, it has been proposed to provide this required relative rotation by making the reach pole in two sections, one fixed to each gear and the two sections being connected together for rotation one with respect to the other, as by making both sections of tubular cross section with one disposed within and adapted to rotate relative to the other. However, under certain conditions such constructions have been found to be objectionable, especially when used in trailers and the like designed for high speed operation, for under these conditions, the connection between the two reach pole sections, by which the required relative rotation is secured may become a source of annoying rattles, especially after the connection becomes worn.

With these features in mind, the principal object of the present invention is, specifically, the provision of a two-section reach pole, each being of tubular cross section and one telescoping within the other, the section of smaller cross section being made longer than the other and extending from one end of the vehicle to the other end thereof, with the smaller reach pole section being fixedly connected to the larger reach pole section in which it is disposed, such fixed connections being rigid and permanent. By virtue of such construction, the required relative rotation of one gear with respect to the other is obtained in the torque deflection of the reach pole section of smaller diameter. In its more generic aspects, this feature of the present invention may be embodied in any reach pole construction in which reliance is placed upon the torque deflection of the reach member to provide the required permissive relative rotation between the front and rear gears. In utilizing the torque deflection to secure the required relative movement, the reach pole may be fixedly or rigidly connected to both the front and rear gears so that there will be no chance for looseness, rattles and the like to develop. In the preferred construction, which will be specifically described later, one gear may be rotated about the longitudinal axis of the vehicle with respect to the other gear through an angle of approximately 45° without stressing the torsionally yieldable reach pole construction beyond its elastic limit.

These and other objects and advantages of the present invention will be apparent to those skilled in the art after a consideration of the following detailed description of the preferred construction, taken in conjunction with the accompanying drawing forming a part of this specification.

In the drawing:

Figure 1 is a top plan view of the running gear or chassis of a vehicle embodying the principles of the present invention;

Figure 2 is a longitudinal section taken along the line 2—2 of Figure 1; and

Figure 3 is a section taken along the line 3—3 of Figure 1.

Referring now to the drawing, the wheeled vehicle with which the present invention is concerned has been illustrated as in the form of a trailer or wagon which comprises a running gear having a rear truck or gear 2 and a front truck or gear 3 connected together by a telescopic reach pole construction indicated in its entirety by the reference numeral 4. Referring first to the rear gear 2, it will be seen that this part comprises an axle 5 on the outer ends of which there are rear supporting wheels 6 and 7 journaled by any suitable form of bearing means. Disposed above the axle 5 but parallel with respect thereto is a rigid member 8 which is formed of preferably two angle irons 9 and 10, as best shown in Figure 2. The member 8 is disposed an appreciable distance above the axle 5 but has its ends connected with the shaft 5 by suitable bracket means. Each bracket means is made up of a pair of plates each of which has a semi-cylindrical recess formed in the lower end thereof, the two recesses of each pair forming a cylindrical opening for receiving the axle 5, and the plates of each pair are rigidly bolted together and clamped around the axle 5 by means of a plurality of bolts, as shown and claimed in my copending application Serial No. 5,724, filed February 9, 1935. At its central portion, the axle 5 is connected to the angles 9 and 10 by a pair of plates 18 which are disposed between the vertical legs of the angles 9 and 10, as best shown in Figure 2, and rigidly connected therewith by means of a bolt 21. A pair of straps 19 embrace the shaft 5 and are securely bolted to the lower ends of the plates 18 by means of bolts 22 or the like. A filler plate 23 is disposed between the rigid member 8, comprising the angles 9 and 10, and the axle 5. At its central portion the filler plate 23 extends between the plates 18.

The rear gear is braced by truss means which not only strengthens the axle but at the same time provides for adjusting the pitch of the rear wheels 6 and 7. The truss means consist of a pair of truss rods 26, one disposed on each side of the axle 5, and these rods bear against an abutment member 27 disposed in the center of the axle 5. Preferably, the abutment 27 is in the form of a triangular piece welded to the inner sides of the straps 19, but if desired the abutment 27 may be welded to the axle or may be formed as an integral part of one or both of the straps 19. The truss rods 26 extend outwardly and upwardly from the abutment block 27 laterally in opposite directions and have their outer ends adjustably connected with the aforesaid bracket means at points above the axle 5. A rear bolster is provided for supporting the rear of the bed or body of the trailer and is preferably formed of a single piece of T-bar stock. The rear bolster is carried on a transversely disposed semi-elliptic spring 36, the central portion of which is bolted to the top of the axle member 8 by means of bolts 40 and 41 disposed on opposite sides of the spring and passing through holes in the flanges of the angle members 9 and 10. The upper threaded ends of the bolts 40 and 41 pass through the rear ends of straps which will be referred to later but which are such that when the bolts are tightened, the central section of a spring 36 is rigidly fastened to the angle members 9 and 10 forming the member 8.

The front gear 3 comprises a transverse beam 43 which is preferably formed of plow beam stock and is supported at its outer ends on a pair of dirigible wheels 44 and 45. Each of the front dirigible wheels includes or is connected with the associated end of the front axle beam 43 by a shaft and spindle assembly 47, the details of which are disclosed and claimed in my copending parent application of which this is a division. One advantage of this construction is that it allows an exceptionally short easy turn, and if the vehicle is to be drawn by draft animals, they are assisted greatly on rough and rutted roads by the elimination of pole whip.

A front bolster similar to bolster for the rear gear 2 has been provided for the front gear 3 and is supported in a similar manner on a transversely disposed leaf spring 69 which rests upon and is bolted to a plate 70 by means of bolts 71 and 72. The plate 70 is welded to the upper ends of a pair of plates or brackets 74 disposed on opposite sides of the front axle beam 43 and securely bolted thereto by a pair of bolts 75. Preferably, the vertical plates 74 include sections extending below the front axle 43, and to the lowermost portions of the plates 74 a U-shaped bracket 79 is welded and is provided with arms which receive the inner threaded ends of truss rods 81. These truss rods extend upwardly and laterally outwardly, as best shown in the aforesaid parent application.

The present invention is principally concerned with a new and improved reach pole construction, the preferred embodiment of which is illustrated in the drawing and indicated in its entirety by the reference numeral 4.

The reach pole construction 4, which connects the front and rear running gears together, comprises two telescopically associated reach pole sections 95 and 96. Preferably these sections are of tubular pipe stock, and the outer diameter of the section 95 is slightly smaller than the inner diameter of the rear section 96 to provide for the telescopic association mentioned. The section 95, hereinafter referred to as the forward section because it is connected with the front gear, is fixed at its front end to the forward gear 3 and has its forward end extending through perforations in the lower portions of the plates 74 and is disposed below the front axle beam 43, as best shown in Figure 2. In order to fix the forward end of the forward section 95 to the front gear 3 a bar 98 is disposed in openings in the lower sections of the plates 74 and is welded to the U-shaped bracket 79. If desired, the bar 98 may also be welded to the plates 74 directly. The rear end of the bar 98 is provided with a suitable opening to receive a bolt 100, and this bolt is utilized in securely fixing the forward end of the reach pole section 95 to the front gear. Secured to the lower portion of the forward reach pole section 95 is a reenforcing strap 102, which may be bolted to the reach pole section 95. The bolt 100 passes through the reenforcing strap 102 and a second bolt 103 disposed in the forward portion of the reach pole section 95 also passes through the reenforcing strap 102 and the forward end of a second reenforcing strap 105 which may also be bolted to the reach pole section 95 if desired.

The forward reach pole section 95 is braced to the front gear 3 by means of a pair of upwardly and forwardly extending braces 107 secured, as by bolts 108, to a short transverse top plate 109, as best shown in Figure 1. A U-shaped strap 110 embraces the reach pole section 95 and has its upper ends secured in place by the bolts 108. Preferably, the rear end of the reenforcing strap 105 is welded to the plate 109. The forward ends of the braces 107 are bolted to the top of the front spring 69 by means of the bolts 71 and 72, the forwardmost ends of the braces 107 having apertures to receive these bolts so that when they are tightened both the braces 107 and the spring 69 are securely fastened to the front gear 3. In addition, a spacer 112 is associated with the rear bolts 71 and serves to hold the braces 107 in proper position.

The forward pole section 95 is further braced to the front gear 3 by means of forwardly and laterally outwardly extending braces 115 and 116 which are connected at their forward ends to bolts 83 at the outer ends of the front axle beam 43. At their inner ends the braces 115 and 116 are welded, as best shown in Figure 2, to the U-shaped bracket 119. Auxiliary braces 120 and 121 are connected between the braces 115 and 116, intermediate the ends thereof, and the stationary portion of the front wheel spindle assembly 47 at each end of the front axle 43.

The rear reach pole section 96 is fixedly connected to the rear running gear 2 by a construction somewhat similar to that described above for the front gear 3. The rear end of the rear pole section 96 extends through perforations in the plates 18, as best shown in Figure 2, and preferably the rear pole section 96 is welded to these plates. The rear reach pole section is braced by a pair of upwardly and rearwardly extending braces 125 and 126 which are fixed at their forward ends to a short transverse bar 127, as by bolt means 128, which is also utilized to secure thereto the ends of a U-shaped member 129 which embraces the rear reach pole section 96 and is otherwise positioned in a manner similar to the U-shaped bracket 110 associated with the forward bracing structure. At their rear ends the braces 125 and 126 are connected to the top of the rear spring 36 by the bolts 40 and 41, the rear sections of the braces 125 and 126 receiving both of these bolts. A spacer 130 is associated with the bolts 41. The rear pole section 96 is further braced by means of a pair of braces 133 and 134, welded at their forward ends to the U-shaped bracket embracing the reach pole section 96 and secured in place by the bolts 128, and the rear ends of the diagonal braces 133 and 134 are bolted or otherwise secured to the brackets at the outer ends of the rear axle 5.

The tubular reach pole sections 95 and 96 are connected together at their rear ends by means of a bolt 140, or the equivalent, which is disposed in aligned perforations in the reach pole sections. In order that the two sections may be clamped rigidly together the upper perforation in the reach pole section 96 is made large enough to receive a bushing 142 (Figure 3) which is forced tightly down upon the upper side of the inner forward pole section 95 by any suitable means, as by a nut 143. The section 96 is provided with additional openings, indicated by the reference numeral 145, in which the bolt 140 may be disposed to lengthen the wheel base of the vehicle.

When the vehicle traverses uneven ground and the points of contact of the supporting wheels do not lie in the same plane so that the forward gear 3 is displaced angularly about a generally longitudinal axis with respect to the rear gear 2, this relative displacement is provided for by the reach pole section 95 yielding in torsion, and the torsional yieldability of the latter is established by the fact that the member 95 is of appreciable length and is rigidly connected at its forward end to the front gear and at its rearmost end to the rear gear, the distance between the points of connection being sufficient to provide the required torsional deflection. Since the connections at the points mentioned are rigid and permanent there is no likelihood of any weaving of the trailer or of rattles developing at this point, and since there is no relative movement at these points of connection, no wear can occur.

While I have shown and described above the preferred embodiment in which the principles of the present invention have been illustrated, it is to be understood by those skilled in the art that my invention is not to be limited to the specific means shown and described but that, in fact, widely different means may be employed in the practice of the broader aspects of my invention.

What I claim, therefore, and desire to secure by Letters Patent is:

1. A wheel supported vehicle comprising a front gear, a rear gear, and means connecting said gears comprising a pair of reach pole sections rigidly connected with said gears, respectively, one of said sections being torsionally yieldable and having one end rigidly connected to one of said gears, and holding means adjacent the other end of said yieldable reach pole section for rigidly connecting said other end of the yieldable section with said other section selectively at any one of a plurality of longitudinally spaced points on said other section so that the amount of torsional yielding of said first section remains constant for any given stress independent of the distance between the front and rear gears.

2. A wheel supported vehicle comprising a front gear, a rear gear, and means connecting said gears comprising a pair of telescopically associated reach pole sections rigidly connected with said gears, respectively, one of said sections being torsionally yieldable and having one end rigidly connected to one of said gears, the other end having an aperture therethrough, the other reach pole section being rigidly connected to the other gear, and means extending through said aperture for rigidly connecting said other end of the yieldable reach pole section with said other section selectively at any one of a plurality of longitudinally spaced points on said other section so that the amount of torsional yielding of said first section remains constant for any given stress independent of the distance between the front and rear gears.

MILES H. TUFT.